Patented Nov. 5, 1935

2,019,758

UNITED STATES PATENT OFFICE 2,019,758

ART OF PREPARING WAX EMULSIONS

John R. MacRill, Whittier, Calif., assignor to California Fruit Growers Exchange, Los Angeles, Calif., a corporation of California No Drawing. Application August 26, 1932, Serial No. 630,538. Renewed April 6, 1935

5 Claims. (Cl. 134—1)

This invention in general relates to the art of processing fruit and particularly citrus fruit, the processing being for the purpose of forming on the fruit a preservative and/or protective coating whereby the fruit are prevented from withering or shrinking upon prolonged storage and from being attacked by molds and other forms of decay.

The invention more particularly relates to the preparation of aqueous wax emulsion materials for use in the treatment or processing of fruit, although the method of preparing the wax emulsion materials and emulsions herein disclosed is applicable to the general art of wax emulsions irrespective of the purpose or use to which such emulsion is put.

A preferred method and process of using a wax emulsion stock of the type described hereinafter is set forth in detail in an application for United States Letters Patent, Serial No. 440,156, filed March 29, 1930, by Russell S. Woglum, Robert D. Nedvidek and John R. MacRill. As pointed out therein, it is necessary to process or condition the fruit so that it may reach the market in the most satisfactory and successful condition. Fresh fruit from groves or orchards is seldom clean, the fruit being generally covered with dust, dirt, grime, smudge, insects, etc. These foreign materials must be completely removed from the fruit and the surface presented in a clean and obviously edible condition before it is ready for marketing. Moreover, it is to be remembered that a considerable period of time may elapse between the picking of the fruit from the trees and the sale of such fruit to the ultimate consumer. Such period of time may include appreciable periods of time in storage, wherein the fruit is permitted to mature and develop a desired color.

In the method of processing described in the aforesaid application, the fruit is contacted with an aqueous wax emulsion whereby a thin film of wax is applied to the fruit. Preferably such wax emulsion includes stabilizing agents and a preserving material such as, for example, pine oil, citrus terpene, etc. The aqueous wax emulsion so applied may contain from 0.8 per cent to 4.3 per cent of wax and a similar amount of solvent, the major portion of the emulsion consisting of water. Such aqueous wax emulsion is readily and evenly distributed over the fruit, the amount of wax deposited upon the fruit being capable of accurate regulation. After the water component of the emulsion has evaporated, the wax coating may be rubbed or polished; if desired, the fruit may be subjected to a rubbing or polishing action during or prior to drying.

The present invention is particularly directed toward a wax emulsion stock capable of being readily converted into an aqueous emulsion of a desired concentration, obviating the necessity of carefully compounding the separate ingredients at the time the treating emulsion is formed.

In accordance with this invention, a wax emulsion stock is prepared in solid form, said stock containing substantially all of the ingredients necessary for the formation of a desired emulsion. This stock in solid form may be shipped or handled readily and dispersed easily and accurately into an emulsion of the desired characteristics, thereby obviating the necessity of employing workmen having particular skill in the preparation and handling of emulsions. This is an important advantage as it is well known that stable emulsions are difficult to prepare and often require a high degree of skill.

It is an object of this invention, therefore, to provide easy and convenient methods for the preparation and handling of wax emulsions and the ingredients thereof.

Another object is to provide a unitary wax emulsion stock particularly adapted for use in wax emulsions for the processing and/or conditioning of a citrus fruit.

Other objects as well as numerous advantages of this invention will become apparent from the description of the invention set forth herein and in the appended claims, within the scope of which it is intended to include all modifications, changes and variations which would occur to those skilled in the art.

In the treatment of citrus fruit, the fruit may be first cleansed and then brought in contact with an aqueous wax emulsion in such manner as to be preferably copiously wet thereby. This may be accomplished by passing the fruit by means of a roller conveyor across an open tank which contains the treating emulsion. The emulsion may be sprayed onto the fruit from above at the near end of the tank. As the fruit progresses to the far end of the tank, the excess emulsion will drip off and return to the tank. After the fruit has been thus treated, it may be passed directly to storage or it may be dried and then stored, or dried and then polished, or dried during polishing, in accordance with the nature of the fruit, the subsequent handling which it is to receive, and the desires and judgment of the person in charge of the operations.

Another satisfactory method of wetting the fruit with the wax emulsions is by bringing the fruit into contact with the main body of the treating fluid. This may be accomplished by immersing the fruit in the emulsion in any suitable way or by any suitable means.

In preparing the preferred wax emulsion stock, the ingredients set forth in the following table may be employed:

Table No. 1—Preferred wax emulsion stock

| | Typical amount | Preferred range | Minimum amount | Maximum amount |
|---|---|---|---|---|
| | *Percent* | *Percent* | *Percent* | *Percent* |
| Paraffin | 55.3 | 40 to 70 | 0.0 | 94 |
| Carnauba | 6.8 | 4 to 10 | 0.0 | 94 |
| Vegetable oil (cottonseed) | 9.8 | 6 to 12 | 0.0 | 20 |
| Oleic acid (stearic acid) | 18.3 | 15 to 22 | 4.0 | 40 |
| Triethanolamine | 9.8 | 7 to 11 | 2.0 | 20 |
| Pine oil or citrus terpenes | 0.0 | 0 to 0.125 | 0.0 | 0.25 |
| Total | 100.0 | | | |

In making up the stock into forms suitable for use, the waxy ingredients are warmed to a temperature slightly above the melting point, preferably to about 180° F. but not over about 250° F. The vegetable oil is then added and stirred thoroughly into the melted waxes with a continuation of heating. The oleic acid or stearic acid and triethanolamine are then added and the mixture blended thoroughly and cooled.

Upon cooling to normal atmospheric temperatures, the mass will be found to be in a substantially solid condition. It will be somewhat less hard and brittle than pure paraffin wax in consistency or texture. The mixture may be cooled in one mass and then cut up as desired or it may be poured into molds and cooled in separate operations so as to give units containing a predetermined amount of the ingredients.

Obviously, this material can now be employed by any ordinary workman for the purpose of making up emulsions highly satisfactory in character. To make up the emulsion, all that is necessary is to heat the wax stock to about 150° F. to 170° F. and add a suitable amount of a desired solvent and heat again to the same temperature. The solvent and melted wax stock is blended well together and is readily formed into an emulsion of a desired character by mixing it with an aqueous soda ash solution.

The wax stock may be combined with the solvent in any suitable and desired proportions. These are indicated in detail in the following table:

Table No. 2—Wax stock with solvent

| | Typical amount | Preferred range | Minimum amount | Maximum amount |
|---|---|---|---|---|
| | *Percent* | *Percent* | *Percent* | *Percent* |
| Wax stock | 47.5 | 40 to 55 | 30 | 90 |
| Solvent | 52.5 | 45 to 60 | 10 | 70 |
| Total | 100.0 | | | |

It is to be understood that a portion of the solvent used in making up the final emulsion may be added to the ingredients set out in Table No. 1, although such addition of solvent will necessarily reduce the melting point and soften the resulting body.

In preparing the final emulsion, it has been found desirable to go through an intermediate step. This comprises making a stock emulsion which is more concentrated than the final emulsion. It has been found desirable to make up the stock emulsion to such a strength that it will contain approximately 10 per cent of actual wax by weight. To prepare the final emulsion, it is only necessary to dilute the stock emulsion to the proper extent with an aqueous solution of soda ash or the like so as to give the final emulsion containing all ingredients in the desired proportions.

The preferred composition of the final emulsion is indicated in the following table:

Table No. 3—Final wax emulsion

| | Typical amount | Preferred range | Minimum amount | Maximum amount |
|---|---|---|---|---|
| | *Percent* | *Percent* | *Percent* | *Percent* |
| Wax stock | 2.4 | 0.8 to 4.32 | 0.201 | 16.1 |
| Solvent | 2.7 | 0.9 to 4.86 | 0.222 | 17.8 |
| Soda ash | 1.0 | 0.25 to 1.25 | 0.125 | 2.0 |
| Additional soap | | A suitable amount | | |
| Water | Balance | Balance | Balance | Balance |
| Total | 100.0 | | | |

It is to be understood that there is no intention to limit the invention to the particular substances enumerated hereinabove. Instead, it should be understood that these materials have been found more suitable than others which have been tried. For example, although specific reference has been made to the use of paraffin wax and Carnauba wax, any suitable and obvious substitute therefor may be employed. The next most suitable material of this type is beeswax. Similarly, although cottonseed oil is preferred, any of the other common vegetable oils of similar properties may be substituted, due account being taken for known differences in properties. The oleic acid used may be either the technical grade which is known in the art as "red oil", or it may be the refined grade which is usually referred to as "triple distilled". At present, oleic acid is preferred but stearic acid has been found to be a very acceptable substitute therefor and other obvious substitutes may be employed.

It should be understood that wherever reference has been made to triethanolamine that reference has been intended to be to the commercial product which apparently contains about 70 to about 75 per cent triethanolamine, 20 to 25 per cent diethanolamine, and 0.02 to 5.0 per cent monoethanolamine. Any one of the pure substances would, of course, give equally satisfactory results, the proportions being varied correspondingly. While no claim is made herein to this subject matter as being novel, it has been found soaps of this particular class are very effective in connection with the process for which this wax emulsion stock is intended. Therefore the use of these particular materials has been specifically indicated. This indication is to be understood as one of preference and not as one of limitation. Obviously, other agents of similar properties may be substituted for the ethanolamine soaps.

Reference has been made to the inclusion of pine oil in the emulsion. This may be very suitably included as an ingredient in the stock wax. The use of pine oil to treat the surface of the fruit so as to prevent the growth thereon of molds and other fungi has been found to be a particularly successful method of preservation. It has likewise been found that terpenes derived from citrus fruit may be used in place of the pine oil, with very satisfactory results. Either or both of these ingredients may be employed and will ordinarily be included in the wax stock in the course of its preparation. Any other suitable preservative agents which it is desired to use may be included.

The soda ash referred to hereinabove acts principally as a stabilizing agent for the finished emulsion and it is to be understood that instead of soda ash, other salts or compounds containing the sodium radical may be employed. By the term "solvents" as used hereinabove, reference is made to petroleum distillates or other organic liquids capable of dissolving the waxes. When petroleum distillates are employed, those similar in characteristics to kerosene and gasoline are preferred.

It will thus be seen that a highly useful wax stock to be used in the preparation of aqueous wax emulsions for processing and/or conditioning citrus fruit in such a way as to enable it to successfully withstand the various unfavorable influences which play upon it between the time it leaves the grove and reaches the hands of the ultimate consumer, has been provided. In order to protect the fruit from shrinkage and/or withering, various more or less waterproof coatings have been suggested. It has likewise been suggested to give the fruit a coating of waxy material. This has heretofore been accomplished by what may be referred to as the cold slab process, or by what may be referred to as the atomization or hot liquid wax process, but these prior processes are not entirely satisfactory.

In the atomization process, the waxy material is brought into liquid condition by means of heat and is then passed through atomizers for the purpose of creating a zone filled with a fog of atomized waxy material. The fruit is then passed through this zone in order to receive the waxy material. With the hot liquid wax method, the wax or wax and solvent is maintained at a high temperature and allowed to drip on the fruit and/or brushes. Such devices are regulated by regulating the rate at which the wax is fed out by the device. Under practical operating conditions the fruit passes through the various mechanisms handling it, with a surprising degree of irregularity, and on that account when a comparatively small amount of fruit is passing through the atomizing or hot wax chamber and brushes, there is a comparatively large amount of waxy material being applied to the fruit and when a large amount of fruit is passing through, a lesser amount of wax is available to be applied to it. As a matter of fact, the fog of waxy material will follow the fruit for considerable distances after it has left the zone where the wax is supposed to be applied, and thus a considerable portion of it will be deposited over other parts of the mechanism and another considerable portion will be dissipated and lost. By the use of the aqueous wax emulsion described herein, these and other disadvantages are overcome.

In the cold slab process the fruit passes over one or more brushing or rubbing rolls or the like. One or more of these is kept in contact with a slab of the solid waxy material which is to be applied to the fruit. Such devices are regulated by regulating the rate at which the waxy material in the slab form is fed to the contact brushes or the like which transfers it to the fruit. This method is subject to substantially the same difficulties as that described above.

As described hereinabove, however, the various disadvantages of the prior wax-applying processes are obviated. The easily regulated amounts of wax may be applied to the fruit without loss of the wax. The difficulties incident to the formation of aqueous wax emulsions are obviated and a wax emulsion stock in substantially solid form has been provided which, upon the addition of a solvent and water, or upon the addition of a solvent and alkali compound and water, or an aqueous soap solution, results in a stable aqueous wax emulsion which comes into intimate contact with the fruit and distributes the wax uniformly over the entire area of the fruit. Variations in quantity of fruit being passed through a treating system do not affect the thickness or amount of wax deposited upon the fruit.

Having thus completely disclosed the invention and the manner in which the same is to be practiced in such full, clear, concise and exact language as to enable others skilled in the art to make and use the same, all of the changes and variations which fall within the scope of the appended claims are desired to be secured by Letters Patent.

I claim:

1. A wax emulsion stock which is substantially solid at ordinary temperatures and capable of forming an emulsion upon being mixed with a solvent and water, said stock consisting essentially of the following ingredients in approximately the proportions indicated: paraffin 553 parts, Carnauba wax 68 parts, vegetable oil 98 parts, oleic acid 183 parts, triethanolamine 98 parts.

2. A wax emulsion stock which is substantially solid at ordinary temperatures and capable of forming a dilute emulsion upon being mixed with a solvent and water, said stock consisting essentially of a major proportion of wax selected from the group consisting of paraffin, Carnauba wax and beeswax, of vegetable oil, of a minor proportion of an acid selected from the group consisting of oleic acid and stearic acid, of triethanolamine, and of not more than 0.25% of a material selected from the group consisting of pine oil and citrus terpenes.

3. A novel method for the preparation and handling of aqueous wax emulsions for applying waxy coatings to citrus fruits and the like, which comprises first, forming an emulsion stock solid at ordinary temperatures and comprised essentially of paraffin and Carnauba wax as major ingredients and of cottonseed oil, oleic acid and triethanolamine as minor ingredients; second, forming a solution of said emulsion stock by dissolving it in a light hydrocarbon solvent; third, diluting and emulsifying the said solution with an aqueous solution of soda ash until the resulting emulsion contains approximately 10 per cent wax by weight and subsequently further diluting the emulsion with an aqueous solution of soda ash until a final emulsion is prepared which contains from about 2¼ to about 4½ per cent by weight of the original wax emulsion stock.

4. A new method for the preparation and handling of aqueous wax emulsions suitable for wax coating of fruit which comprises first, forming an emulsion stock solid at ordinary temperatures and comprised essentially of paraffin, Carnauba wax, vegetable oil, oleic acid and triethanolamine, subsequently forming a solution of said emulsion stock in a light hydrocarbon solvent and thereafter diluting and emulsifying such solution with portions of aqueous soda ash solution until a final emulsion is prepared containing from about 2 to about 5 per cent of the original emulsion stock by weight.

5. A method of preparing aqueous wax emulsions for applying waxy coatings to citrus fruit and the like, which comprises dissolving a substantially solid emulsion base containing paraffin and Carnauba wax as major ingredients, vegetable oil, oleic acid and triethanolamine as minor ingredients, in a hydrocarbon solvent, and then diluting and emulsifying such solution of solvent and emulsion stock with an aqueous solution containing a sodium compound so as to form a final emulsion containing from about 2 to 5 per cent of the original emulsion base by weight.

JOHN R. MacRILL.